(12) United States Patent
Lewis

(10) Patent No.: US 9,758,977 B2
(45) Date of Patent: Sep. 12, 2017

(54) APPARATUS AND METHOD FOR REPAIR OF ASPHALT SHINGLES

(71) Applicant: Fortis Warranty, LLC, Denver, CO (US)

(72) Inventor: Richard M. Lewis, Denver, CO (US)

(73) Assignee: Fortis Warranty, LLC, Denver, CO (US)

( * ) Notice: Subject to any disclaimer, the term of this patent is extended or adjusted under 35 U.S.C. 154(b) by 0 days.

(21) Appl. No.: 15/080,986

(22) Filed: Mar. 25, 2016

(65) Prior Publication Data

US 2016/0281377 A1    Sep. 29, 2016

Related U.S. Application Data

(60) Provisional application No. 62/139,481, filed on Mar. 27, 2015.

(51) Int. Cl.
| | | |
|---|---|---|
| *E04G 23/00* | (2006.01) | |
| *E04G 23/02* | (2006.01) | |
| *B29C 73/06* | (2006.01) | |
| *E04D 13/00* | (2006.01) | |
| *B29K 105/00* | (2006.01) | |
| *B29K 19/00* | (2006.01) | |
| *B29K 105/08* | (2006.01) | |
| *B29L 31/10* | (2006.01) | |

(52) U.S. Cl.
CPC .......... *E04G 23/0281* (2013.01); *B29C 73/06* (2013.01); *E04D 13/00* (2013.01); *B29K 2019/00* (2013.01); *B29K 2105/0809* (2013.01); *B29K 2105/253* (2013.01); *B29L 2031/108* (2013.01)

(58) Field of Classification Search
CPC . E04G 23/02; E04G 23/0296; E04G 23/0203; E04G 23/0214; E04G 23/0281; B29C 73/06; E04D 13/14; E04D 13/16; E04B 1/64
USPC ............ 52/514, 741.4, 741.1, 741.3, 746.11; 156/94; 264/31; 428/65.9
See application file for complete search history.

(56) References Cited

U.S. PATENT DOCUMENTS

| | | | | |
|---|---|---|---|---|
| 3,215,243 | A * | 11/1965 | Dickerson | ............... E04G 23/02 156/94 |
| 3,996,396 | A * | 12/1976 | Hansen | ..................... E04D 7/00 156/280 |
| 4,009,743 | A * | 3/1977 | Ackerman | ............ E04D 15/003 30/169 |
| 4,916,880 | A * | 4/1990 | Westerman, Jr. | ....... B29C 73/04 156/94 |
| 6,607,621 | B1 * | 8/2003 | Swanson | ............. E04G 23/0203 156/71 |
| 6,918,219 | B1 * | 7/2005 | Olson | ...................... E04D 1/36 52/506.01 |
| 7,971,405 | B2 * | 7/2011 | Hansen | ................... E04F 13/04 156/94 |

(Continued)

*Primary Examiner* — Beth Stephan
(74) *Attorney, Agent, or Firm* — Swanson & Bratschun, L.L.C.

(57) ABSTRACT

A wafer for repairing damage to asphalt shingles comprising a first layer of a rubberized asphalt, a fiber matrix layer and a second layer of the rubberized asphalt. The first and second layers of rubberized asphalt sandwich and are bound to the fiber matrix layer forming an integrated wafer. The wafer is formed in a select shape.

7 Claims, 9 Drawing Sheets

(56) References Cited

U.S. PATENT DOCUMENTS

| | | | | |
|---|---|---|---|---|
| 2002/0110679 A1* | 8/2002 | Miller | ............... | D06N 5/00 |
| | | | | 428/297.1 |
| 2003/0040241 A1* | 2/2003 | Kiik | ............... | A47G 27/0468 |
| | | | | 442/242 |
| 2005/0204675 A1* | 9/2005 | Snyder | ............... | B32B 11/02 |
| | | | | 52/555 |
| 2007/0199251 A1* | 8/2007 | Sieling | ............... | E04D 1/26 |
| | | | | 52/58 |
| 2007/0260011 A1* | 11/2007 | Woods | ............... | C09J 133/08 |
| | | | | 524/589 |
| 2010/0192509 A1* | 8/2010 | Sieling | ............... | E04D 1/26 |
| | | | | 52/741.3 |

\* cited by examiner

APPARATUS AND METHOD FOR REPAIR OF ASPHALT SHINGLES

RELATED APPLICATIONS

This application claims priority from U.S. Provisional Patent Application Ser. No. 62/139,481, filed Mar. 27, 2015, entitled "Apparatus and Method for Repair of Asphalt Shingles," which is hereby incorporated by reference.

TECHNICAL FIELD

The present disclosure is directed to asphalt shingles, and more particularly to an apparatus and method for repair of asphalt shingles.

BACKGROUND

Asphalt shingles are widely used as a roofing material in North America and other parts of the world. A typical shingle consists of a base which may be formerly-living organic base, a fiberglass base or another similar material. One or both sides of the asphalt-saturated base is coated with asphalt or modified-asphalt. Typically each shingle has an exposed top surface portion intended for exposure to the elements and an underlying portion intended to be covered by the exposed top surface portion of an overlying shingle. The exposed top surface portion typically has a granular material embedded in the asphalt or modified-asphalt such as slate, schist, quartz, vitrified brick, stone or ceramic granules. It is also known to provide self-sealing strips on the underside of the exposed surface portion to attach the exposed surface portion to the underlying portion of a lower shingle.

While asphalt shingles have proven to be extremely versatile and durable under most conditions, they are susceptible to damage when impacted by falling objects, most notably, hail, and in particular, hailstones larger than 1.5 inches in diameter.

The typical solution for a hail damaged asphalt shingle roof is replacement of the entire roof. However, research has shown that in the vast majority of hail incidents, only a small fraction of asphalt shingles on a roof are typically damaged. Furthermore, research has shown that particularly where the roof is within its serviceable life, the damage to the shingles is more cosmetic than structural. As a result, most asphalt shingle roofs within their service life can be repaired rather than replaced if an efficient and effective manner of shingle repair can be developed.

One known technique for the repair of hail damaged shingles consists of a process where a hail damaged top surface portion of a shingle is pivoted up to reveal an underlying portion of a lower shingle. A liquefied roofing asphalt is applied to the top surface of the underlying portion of the lower shingle underlying the point of impact of the overlying exposed top surface portion. Often a solvent based primer is first applied to improve adhesion. Thereafter, the damaged exposed top surface portion is pivoted back into contact with the underlying portion of the lower shingle and pressure is applied to the exposed top surface portion to adhere it to the liquid asphalt and, where the damage has resulted in fissures in the exposed top surface of the shingle, to promote flow of the liquid asphalt into any fissures formed in the impact area of the damaged shingle. Thereafter, granules matching those of the exposed surface area are applied to the point of impact and pressure is applied to embed the granules into the liquid asphalt which has flowed through the fissures. Thereafter, a tri-polymer sealant is applied to the impact point and surrounding surface area. While this method has proven effective at repairing hail damaged asphalt shingles, it is somewhat cumbersome because of the need to apply the liquid asphalt and most liquid asphalts are prone to brittleness with time.

The present invention is directed toward overcoming one or more of the problems discussed above.

SUMMARY OF THE DISCLOSURE

A first aspect of the disclosure is a wafer for repairing damage to asphalt shingles. The wafer comprises a first layer of a rubberized asphalt, a fiber matrix layer and a second layer of the rubberized asphalt. The first and second layers of rubberized asphalt sandwich and are bound to the fiber matrix layer forming an integrated wafer. The wafer is formed in a select shape. In various embodiments, the fiber matrix layer made of one or more of a fiberglass mat, a nylon weave or a stitched fiber. Embodiments may include a solvent-based primer layer disposed between the first and the second layers of the rubberized asphalt. In some embodiments the solvent-based primer layer is impregnated in the fiber matrix layer. Embodiments include those where the select shape is chosen to match the damage to the asphalt shingle. For example, the select shape may be circular where the damage to the asphalt shingle is caused by a hailstone.

A second aspect of the disclosure is a method of making a wafer for repairing damage to asphalt shingles. In one embodiment the method includes providing a first layer of a liquid rubberized asphalt. A fiber matrix layer is provided having a first side and a second side with the first side being placed in contact with the first layer of rubberized asphalt. Also provided is a second layer of a liquid rubberized asphalt that is disposed in contact with the second side of the fiber matrix layer. The first and second layers of liquid rubberized asphalt are then cured, wherein the first and second layers of liquid asphalt are bound to the fiber matrix forming an integrated wafer. Embodiments may include providing a providing a solvent-based primer between the first and the second layers of liquid rubberized asphalt. In certain embodiments the solvent-based primer is provided impregnated in the fiber matrix layer. Embodiments may include forming to the wafer in a select shape by providing a mold within which the wafer is formed. Alternatively the integrated wafer may be initially formed in a sheet and subsequently wafers are cut to a select shape following the curing step. In embodiments where the wafer is formed in a mold, the mold may be lined with a nonstick material, for example, a sheet of a nonstick material.

Yet another aspect of the present disclosure is a method for repairing a damaged asphalt shingle of a plurality of asphalt shingles disposed on a roof, that damaged asphalt shingle being damaged at an impact point from an impact to an exposed top surface portion. The asphalt shingles are of an over-lapping type with each shingle having at least one exposed top surface portion. The method for repairing includes providing a wafer comprising first and second layers of rubberized asphalt sandwiching a layer of a fiber matrix material. The damaged exposed top surface portion of the damaged shingle is raised to reveal an underlying portion of a lower shingle. The wafer is heated to above the softening point temperature of the first and second layers of rubberized asphalt and the heated wafer is placed on the underlying portion of the lower shingle such that with the damaged exposed top surface of the shingle lowered, the impact point overlies the heated wafer. With the damaged exposed top surface portion lowered onto the heated wafer, pressure is applied to the damaged exposed top surface portion sufficient to deform the heated wafer. The pressure may be applied by a cylindrical roller rolled over the impact point and the exposed top surface portion of the damaged shingle surrounding the impact point. In instances where the impact has caused fissures in the damaged shingle proximate the impact point, the pressure is sufficient to extrude rubberized asphalt into such fissures. Embodiments may further include applying granules matching granules visible on the exposed top surface portion of the damaged shingle to the area surrounding the impact point, wherein the granules bind to extruded rubberized asphalt from the fissures proximate the impact point. Embodiments may further include applying pressure to the granules to promote seating in the extruded rubberized asphalt. Embodiments may further include applying a tri-polymer fibered sealant to the impact point and the exposed top surface portion of the damaged shingle surrounding the impact point. Embodiments may further include applying a solvent based primer to the underlying portion of the lower shingle or the underside of the exposed portion of the damaged shingle where the heated wafer is to be placed.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

While various aspects and features of certain embodiments have been summarized above, the following detailed description illustrates a few embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
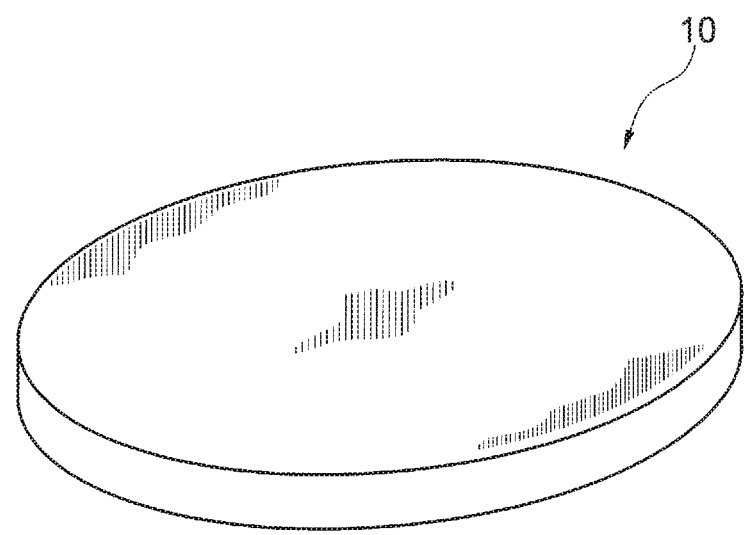
FIG. 1 is perspective view of a wafer for repairing damage to asphalt shingles in accordance with the present disclosure.

FIG. 1 is a perspective view of a wafer 10 for repairing damage to asphalt shingles. In various embodiments the wafer 10 can be between 1-3 inches in diameter, though it can be either bigger or smaller for particular applications. The thickness can be between 0.1-0.3 inches for most applications, though it can be either thicker or thinner for specific applications.

Figure 2:
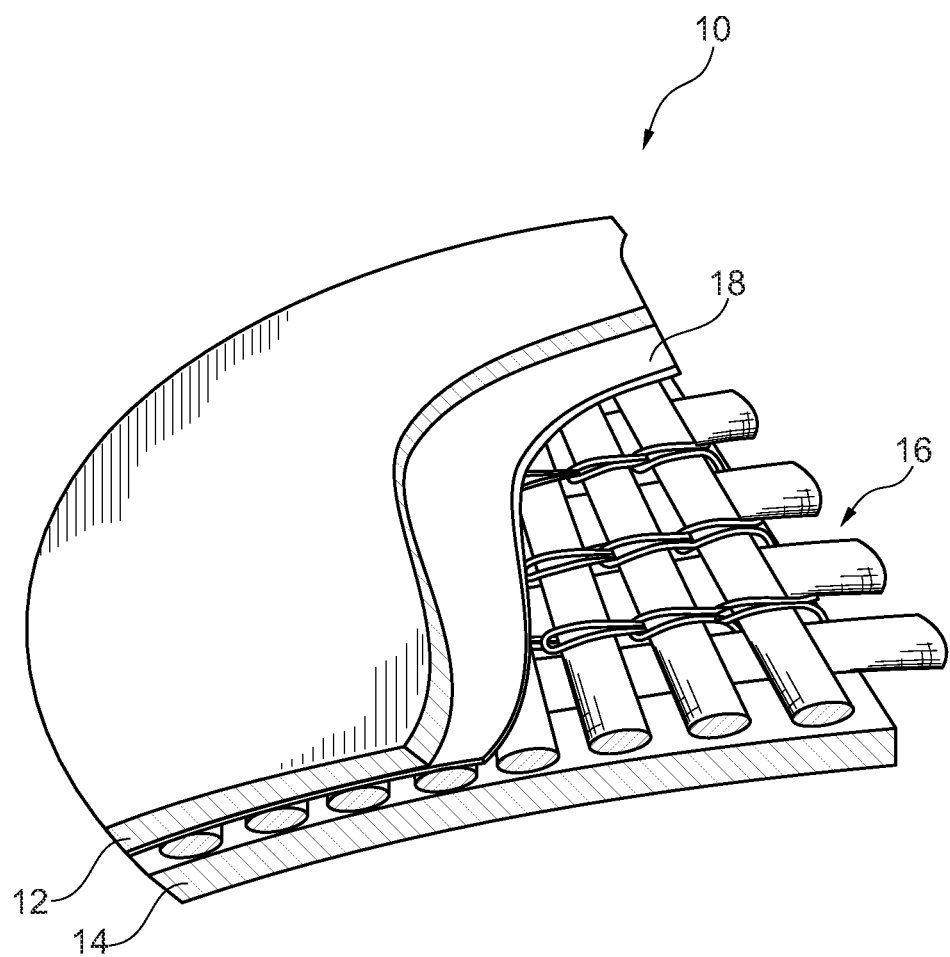
FIG. 2 is a cutaway portion of the wafer of FIG. 1 for the purpose of illustrating its construction.

FIG. 2 is a cutaway section of the wafer 10 revealing an embodiment of the wafer 10 construction. In this embodiment the wafer 10 comprises a first layer of a rubberized asphalt 12 and a second layer of the rubberized asphalt 14 sandwiching a fiber-matrix layer 16 therebetween. The rubberized asphalt may be a styrene-butadiene-styrene (SBS) or any other of the materials commonly known as rubberized asphalt. Desirable characteristics of the rubberized asphalt used in various embodiments would include minimal cracking, adhesion loss or splitting with time, low water vapor permeability, good water resistance, a softening point about 212 degrees Fahrenheit, good heat stability and a high flash point. The fiber-matrix layer 16 may be made of a number of materials and weaves. For example, the fiber-matrix layer 16 may be one or more of a fiberglass mat, a nylon weave or a stitched fiber (which is illustrated in the embodiment of FIG. 2). Embodiments may also include a solvent-based primer layer 18 between the first and second layers of the rubberized asphalt 12, 14. Embodiments may include the solvent-based primer layer 18 being impregnated in the fiber-matrix layer 16. Sheets of fiber-matrix material pre-impregnated with a solvent-based primer are commercially available. The wafer 10 is formed in a manner such that the first and second layers of the rubberized asphalt 12, 14 and the fiber-matrix layer 16 are bound to form an integrated wafer 10 as illustrated in FIG. 1. An embodiment of a method of making a wafer 10 is described in greater below.

Figure 3:
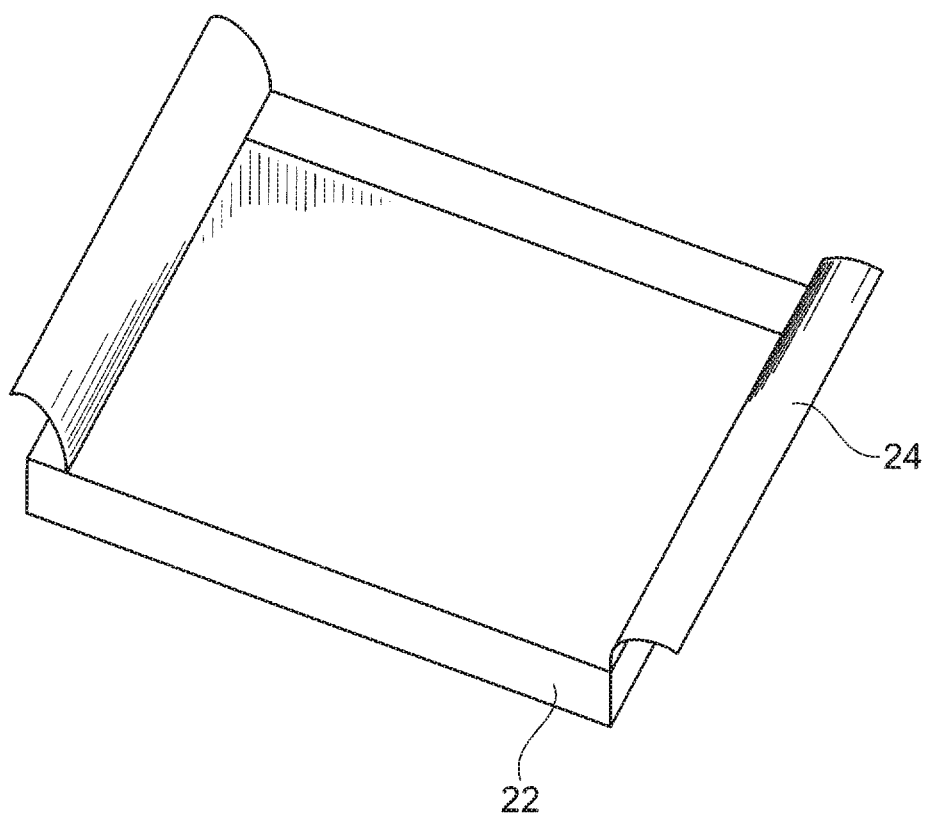
FIG. 3 is a mold for forming a wafer sheet.
Figure 4:
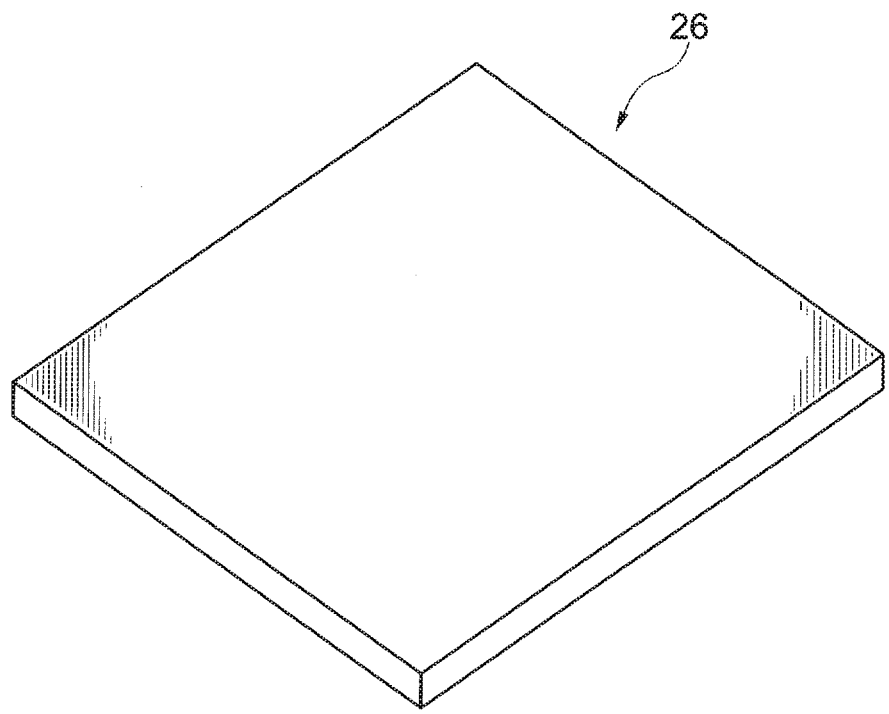
FIG. 4 is a wafer sheet formed from the mold of FIG. 3.

FIG. 3 is a perspective view of a mold for forming a sheet of integrated wafer. In this embodiment the mold consists of a pan 22 lined with a nonstick material. In the embodiment illustrated in FIG. 3, the nonstick material is a sheet 24 which may be, for example, a sheet of a suitable polymer wrap. Alternatively, the pan 22 could be treated with a nonstick material, for example, Teflon. In one embodiment of a method of manufacture, a first layer of liquid rubberized asphalt is provided in the bottom of the pan 22 to a suitable depth. Next the fiber-matrix layer 16 is laid over the first layer of liquid rubberized asphalt. Embodiments could include placement of a solvent-based primer layer 18 below and above the fiber-matrix layer 16 or, as described above, the fiber-matrix layer 16 may be impregnated with a solvent-based primer layer 18. Next, a second layer of liquid rubberized asphalt is poured over the fiber-matrix layer 16. The first and second layers of the rubberized asphalt 12, 14 are allowed to permeate the fiber-matrix layer 16 and then the first and second layers of the rubberized asphalt 12, 14 are cured to bind with the fiber-matrix layer 16 forming an integrated wafer sheet 26, as illustrated in FIG. 4. The integrated wafer sheet 26 is then cut to provide a number of wafers of various shapes or of a single select shape, for example, cut into a plurality of circular wafers 10 as shown in FIG. 1. Alternatively, the wafers 10 could be formed individually from suitable molds in the forming process described above. It should be noted that while the embodiment of the wafer 10 is shown having a circular configuration, other configurations such as squares, rectangles, ovals or the like may be preferred for particular applications.

Figure 5:
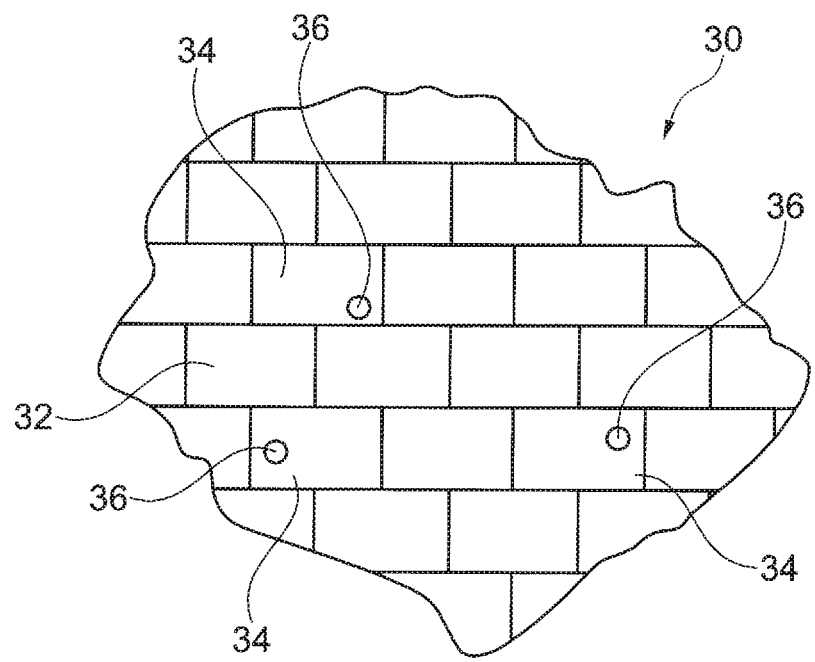
FIG. 5 is a portion of an asphalt shingle roof subjected to hail damage.

FIG. 5 illustrates a portion of an asphalt shingle roof 30 comprising a plurality of individual asphalt shingles 32. The asphalt shingle roof 30 includes a number of damaged asphalt shingles 34 damaged at an impact point 36, as might result from large hailstones. Each of the individual asphalt shingles 32 are configured to overlap a portion of a lower shingle with an exposed top surface portion (which is also indicated by the reference number 32 in FIG. 5).

Figure 6:
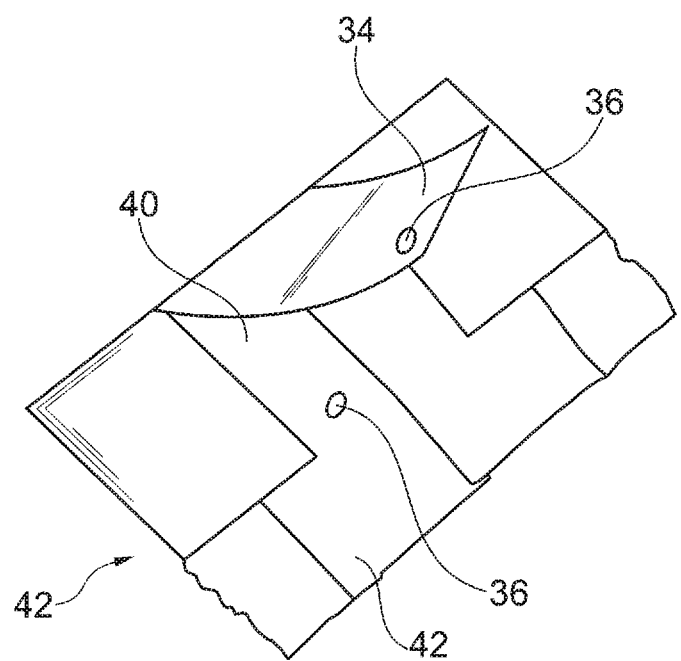
FIG. 6 is a damaged top surface portion of a shingle having an impact point pivoted up or lifted to reveal an underlying portion of a lower shingle.

A method for repairing a damaged asphalt shingle is illustrated in part by reference to FIG. 6. First, a wafer 10 is provided. The damaged asphalt shingle 34 is raised or pivoted upward revealing an underlying portion 40 of a lower asphalt shingle 42. In the example illustrated in FIG. 6, the impact point 36 extends to the underlying portion 40 of the lower asphalt shingle 42. The embodiment may include applying a solvent-based primer layer to the underlying portion 40 of the lower asphalt shingle 42 about the impact point 36. The solvent-based primer layer can also be applied to the underside of the exposed portion of the damaged asphalt shingle 34 about the impact point 36.

Figure 7:
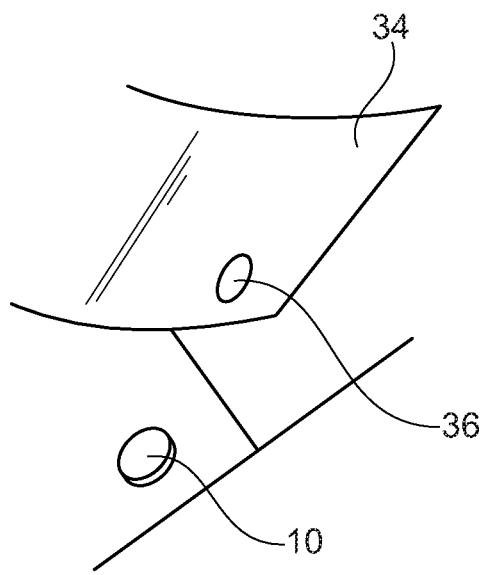
FIG. 7 is a wafer of FIG. 1 placed over the damaged portion of the underlying shingle.
Figure 8:
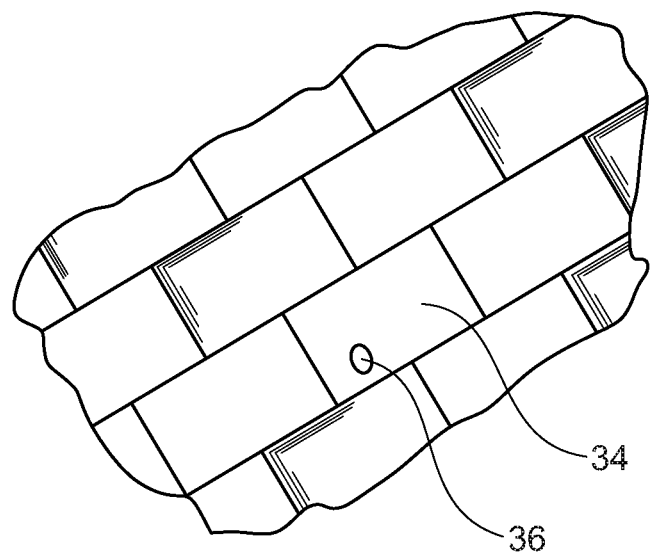
FIG. 8 shows the damaged shingle pivoted into contact with the underlying portion of the lower shingle.
Figure 9:
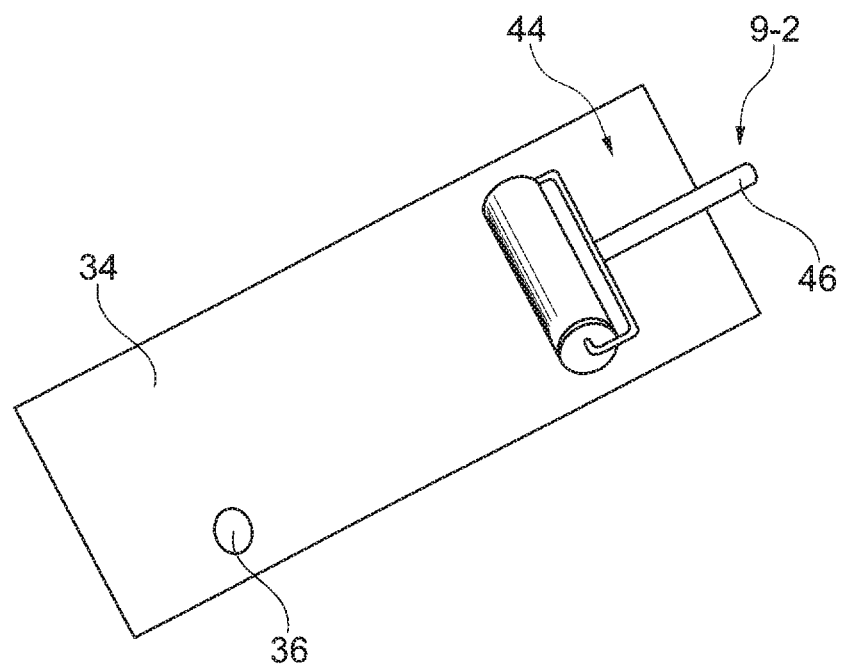
FIG. 9 illustrates one embodiment for applying pressure to the exposed top surface portion of the damaged shingle.
Figure 10:
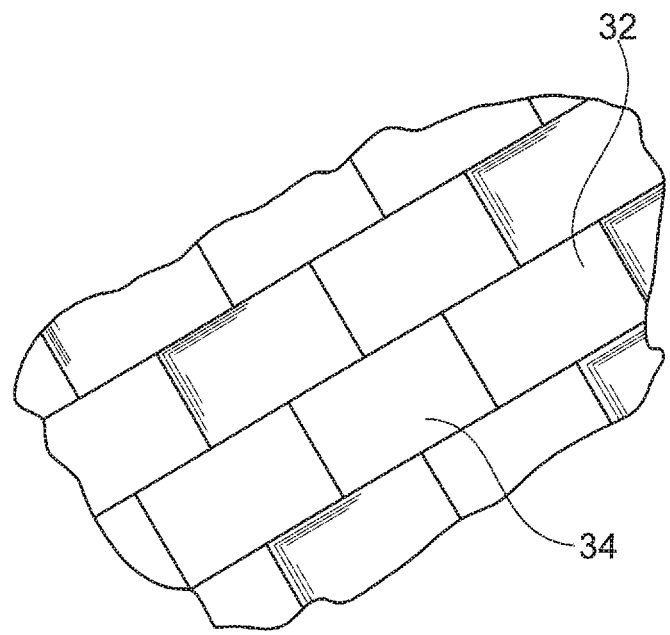
FIG. 10 is a hail damaged roof following repair in accordance with the method of the present disclosure.

The wafer 10 is then heated to above the softening point temperature of the first and second layers of the rubberized asphalt 12, 14 and placed over the impact point 36 on the underlying portion 40 of the lower asphalt shingle 42 or otherwise aligned in a manner such that with the exposed portion of the damaged asphalt shingle 34 pivoted down over the underlying portion 40, the impact point 36 on the exposed damaged asphalt shingle 34 overlies the wafer 10. This placement is illustrated in FIG. 7 and the damaged asphalt shingles 34 is shown pivoted down in FIG. 8. With the damaged asphalt shingles 34 in the position illustrated in FIG. 8, pressure is applied over the impact point 36. If the impact is sufficient, fissures will have formed in and around the impact point 36 allowing for the rubberized asphalt of the wafer 10 to extrude into the fissures under the application of pressure in and around the impact point 36 to the exposed surface of the damaged asphalt shingles 34. The method can further include then applying granules matching granules on the damaged asphalt shingles 34 to the extruded rubberized asphalt and then applying pressure to seat the granules in the extruded rubberized asphalt to finish the repair of the impact point 36. A segment of the repaired roof is illustrated in FIG. 9. In one embodiment, the pressure is applied by a cylindrical roller 44 which is grasped by a handle 46 by a user and rolled over the impact point 36 and the exposed top surface portion of the damaged asphalt shingle(s) 34 surrounding the impact point 36. After the granules have been seated, a tri-polymer fiber sealant or other suitable sealant can be applied in and around the impact point 36 to complete the repair. FIG. 10 illustrates the repaired roof.

Figure 11:
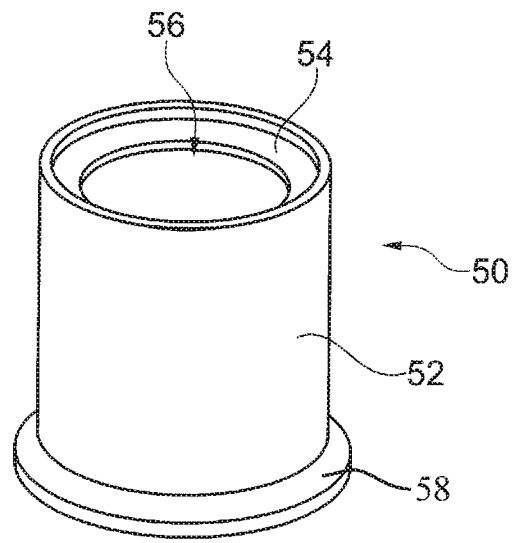
FIG. 11 is a perspective view of a fixture for heating and manipulating a wafer.
Figure 12:
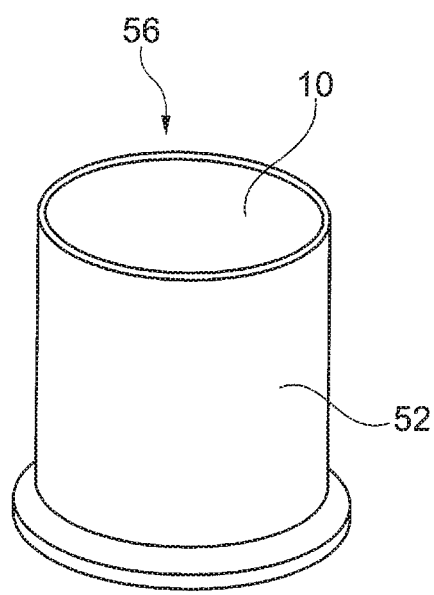
FIG. 12 is a perspective view of the fixture of FIG. 11 containing a wafer.

FIG. 11 illustrates an embodiment of a fixture 50 for holding a wafer 10 as it is heated before placement to repair a damaged shingle. The fixture 50 has a cylindrical body 52 having an open top end with a shelf 54 defining a receptacle 56 for receiving a wafer 10. At the bottom of the cylinder is a flange 58 suitable for gripping by, for example, a pair of pliers, a vice grip or the like. FIG. 12 illustrates a wafer 10 received in the receptacle 56. In use, a wafer is placed in the receptacle 56 as shown in FIG. 12 and heated using any suitable heat element, such as a blow torch. Embodiments could include a heater being integrated into the fixture 50 and embodiments could include the fixture 50 having a handle. The wafer 10 is heated to above the softening point of the rubberized asphalt and the fixture can then be manipulated and tipped to locate the wafer 10 as desired.

Figure 13:
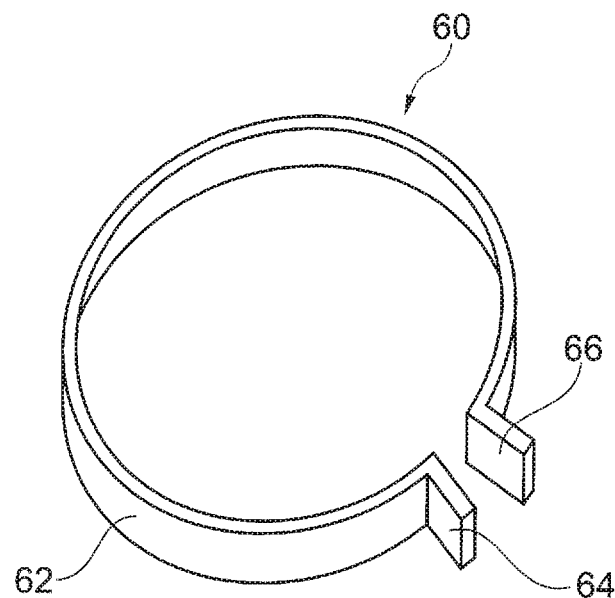
FIG. 13 is a perspective view of an alternate embodiment of a fixture for heating and manipulating a wafer.
Figure 14:
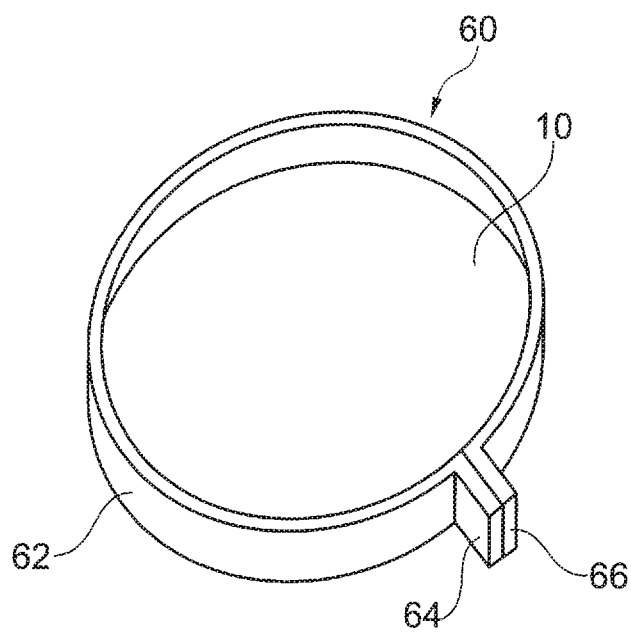
FIG. 14 is a perspective view of the fixture of FIG. 13 containing a wafer.

FIG. 13 illustrates another embodiment of a fixture 60 for holding a wafer 10 as it is heated before placement to repair a damaged shingle. The fixture 60 is made from a metal band 62 having tabs 64, 66 at each end. The metal band is self-biased to an arcuate configuration with a gap between the tabs 64, 66, as illustrated in FIG. 13. The band defines a circle when the tabs 64, 66 are forced together as shown in FIG. 14, the circle having a diameter just less than that of a wafer 10. In use, a wafer 10 is placed with edges abutting an inner surface of the arcuate metal band 62 and the tabs are drawn together, thus compressing the wafer within the now circular form of the band 62, but without significant deformation of the band, as illustrated in FIG. 14. The tabs 64, 66 can then be grasped by a pliers, vice grip or the like and held in abutment while the wafer is heated using any suitable heat element, such as a blow torch.

Embodiments could include a heater being integrated into the fixture 50 or 60 and embodiments could include the fixture 60 having a handle configured for ease of drawing the tabs 64, 66 into abutment. The wafer 10 is heated to above the softening point of the rubberized asphalt and the fixture can then be manipulated to locate the wafer 10 as desired, and the wafer can be released by releasing the tabs 64, 66.

The description of the various embodiments has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiments described and shown in the figures were chosen and described in order to explain the principles of the invention, the practical application, and to enable others of ordinary skill in the art to understand the invention for various embodiments with various modifications as are suited to the particular use contemplated. All references cited herein are incorporated in their entirety by reference.

What is claimed is:

1. A method for repairing a damaged asphalt shingle of a plurality of asphalt shingles disposed on a roof, the plurality of shingles overlapping one another with each shingle having at least one exposed top surface portion, the damaged shingle being damaged from an impact to an exposed top surface portion of the damaged shingle at an impact point, the method for repairing comprising:
   providing a wafer comprising first and second layers of rubberized asphalt sandwiching a layer of a fiber matrix material;
   raising the damaged exposed top surface portion of the damaged shingle to reveal an underlying portion of a lower shingle;
   heating the wafer to above a softening point temperature of the first and second layers of the rubberized asphalt;
   placing the heated wafer on the underlying portion of the lower shingle such that with the damaged exposed top surface of the shingle lowered the impact point will overlie the heated wafer; and
   applying pressure to the damaged exposed top surface portion of the damaged shingle sufficient to deform the heated wafer.

2. The method for repairing of claim 1 wherein the applying pressure step comprises providing a cylindrical roller and rolling the cylindrical roller over the impact point and the exposed top surface portion of the damaged shingle surrounding the impact point.

3. The method of claim 1 wherein in the applying pressure step sufficient pressure is provided to extrude rubberized asphalt into any fissures of the damaged shingle proximate the impact point.

4. The method of claim 3 further comprising applying granules matching any granules visible on the exposed top surface portion of the damaged shingle to the area surrounding the impact point, wherein the granules bind to extruded rubberized asphalt from the fissures proximate the impact point.

5. The method of claim 4 further comprising applying pressure to the granules to promote seating in the extruded rubberized asphalt.

6. The method of claim 4 further comprising applying a tri-polymer fibered sealant to the impact point and the exposed top surface portion of the damaged shingle surrounding the impact point.

7. The method of claim 1 further including before the step of placing the heated wafer on the underlying portion of the lower shingle, a solvent based primer is applied to the underlying portion of the lower shingle.

* * * * *